No. 798,435. PATENTED AUG. 29, 1905.
B. MAYER.
BIFOCAL LENS.
APPLICATION FILED MAR. 13, 1905.

Witnesses
Edwin L. Bradford
J. Ferdinand Vogt.

Inventor
Benjamin Mayer

By Mann & Co,
Attorneys

UNITED STATES PATENT OFFICE.

BENJAMIN MAYER, OF BALTIMORE, MARYLAND.

BIFOCAL LENS.

No. 798,435.　　　Specification of Letters Patent.　　　Patented Aug. 29, 1905.

Application filed March 13, 1905. Serial No. 249,690.

*To all whom it may concern:*

Be it known that I, BENJAMIN MAYER, a citizen of the United States, residing at Baltimore, in the State of Maryland, have invented certain new and useful Improvements in Bifocal Lenses, of which the following is a specification.

In bifocal lenses which are made of two separate pieces there is formed a crease, ridge, joint, or edge at that part of the border of the smaller field which adjoins the larger field that is not only perceptible, but, in fact, is obtrusive or conspicuous to a degree that is objectionable. In one class of the two-piece bifocal the near field or high power is in the form of a thin wafer of glass laid upon the larger lens and the two pieces are cemented together. This class of bifocals has well-known objections. Another class of the two-piece bifocal has the edges of the two pieces abutted together, and the two pieces are retained in proper relation to each other by the surrounding metal eye-rim of the frame; but both classes of the two-piece bifocal lens have the objectionable crease, ridge, joint, or edge referred to. Attempts have also been made to produce solid bifocal lenses ground from one piece of glass. In one style the weaker or distance focus is formed at the upper portion of the lens by grinding it off on a plane. These have been prismatic to an extent that has caused discomfort and actual injury to the eyes. This kind of bifocal has the upper or distance field relatively smaller than the lower or near field, which is in reality the reverse or opposite of the natural requirements of the eye. Manufacturing opticians have in their catalogues frankly refused to recommend these lenses. Another style of solid bifocal lens made of one piece has been proposed, in which the near or lower field has an outline or border whose edge is raised or on a different plane from the adjoining larger field. This raised edge is as objectionable in point of appearance, because of its conspicuous character, as the two-piece bifocal.

The improved solid bifocal lens herein described has none of these objections. It has the least prismatic effect of any known form of bifocal. This is due to the uniformity of thickness of the lens at the line of joinder of the top and bottom fields, said uniformity of thickness being readily seen on a vertical axial line through both fields. The improved lens also avoids all the objections inherent in bifocal lenses made in two pieces.

The invention is illustrated in the accompanying drawings, in which—

Figure 1:
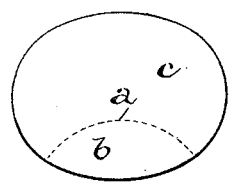
Figure 2:
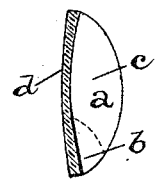
Figure 3:
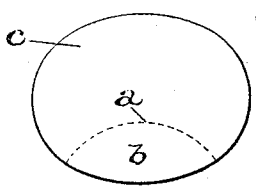
Figure 4:
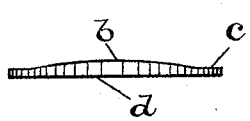
Figure 5:
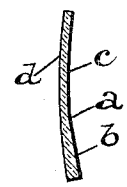
Figure 6:
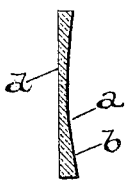
Figure 7:
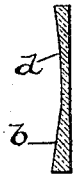
Figure 8:

Figures 1 and 2 illustrate a front and a perspective sectional view of the improved periscopic lens, in which the near or reading field inside is plano. Figs. 3, 4, and 5 illustrate a front, bottom edge, and sectional view of the improved concavo-convex lens in which the near or reading field inside is convex. Fig. 6 is a vertical section of a lens whose outside is plane with a concave inner and a near or reading field plano. Fig. 7 is a vertical section having a concave outside with a plane near or reading field also outside and a plane inner surface. Fig. 8 shows a vertical section having a plane outside, a convex inner side, and a near or reading field plano.

In the improved lens the desired conventional arched top $a$ over the lower or near field $b$ is preserved, and this arched division-line is the only separation between the near field and the distance field $c$. When the lens is worn, this arched division-line $a$ is practically invisible to persons other than the wearer.

The planes of the two adjoining fields $b$ $c$ in the solid glass are so related to each other— the surface of one so merges into the other— as to avoid prismatic effects. There is no "seeing the lines," and this construction also avoids attracting attention to the fact that the glasses have two foci, because the line of joinder between the upper and lower fields forms neither a crease nor a projecting ridge and is invisible to persons other than the wearer.

The outside $d$ of the lens may have any of the usual forms—concave, convex, or plane.

This special form of solid bifocal obviates the objections herein pointed out as existing in all other forms. It insures an absence of prismatic effects. It gives a clear or maximum distance field, and the two focal surfaces of the lens have no projecting edge or ridge. In addition to these advantages this form of lens can be made cheaper and sold to the wearer at less price than any other known form.

Having thus fully described my invention, what I claim as new, and desire to secure by Letters Patent, is—

A bifocal lens comprising one piece of glass having an upper distance field, a lower and smaller near field, and an arched division separating the two fields, but the lens at the curved line of joinder of the upper and lower fields having a uniform thickness through both fields, whereby the said division is practically free from prismatic effects.

In testimony whereof I affix my signature in presence of two witnesses.

BENJAMIN MAYER.

Witnesses:
CHARLES B. MANN, Jr.,
G. FERDINAND VOGT.